May 28, 1968     R. NOUEL     3,384,929
APPARATUS FOR MOLDING PLASTICS
Original Filed April 15, 1963     4 Sheets-Sheet 2
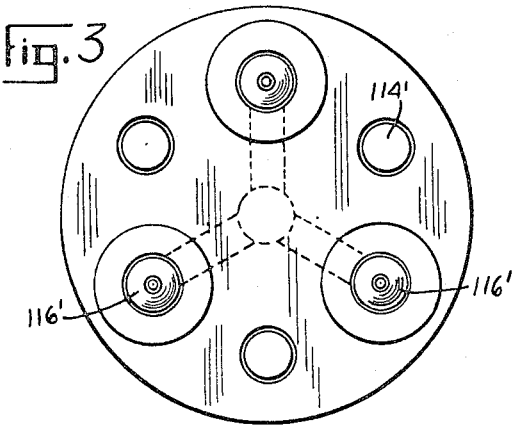
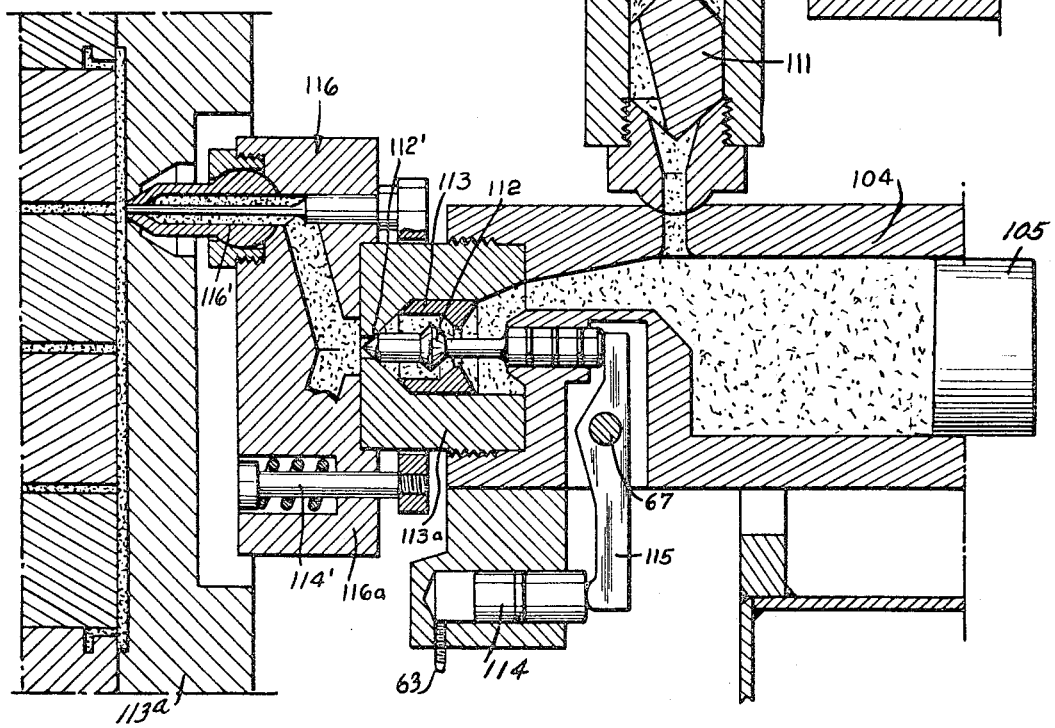

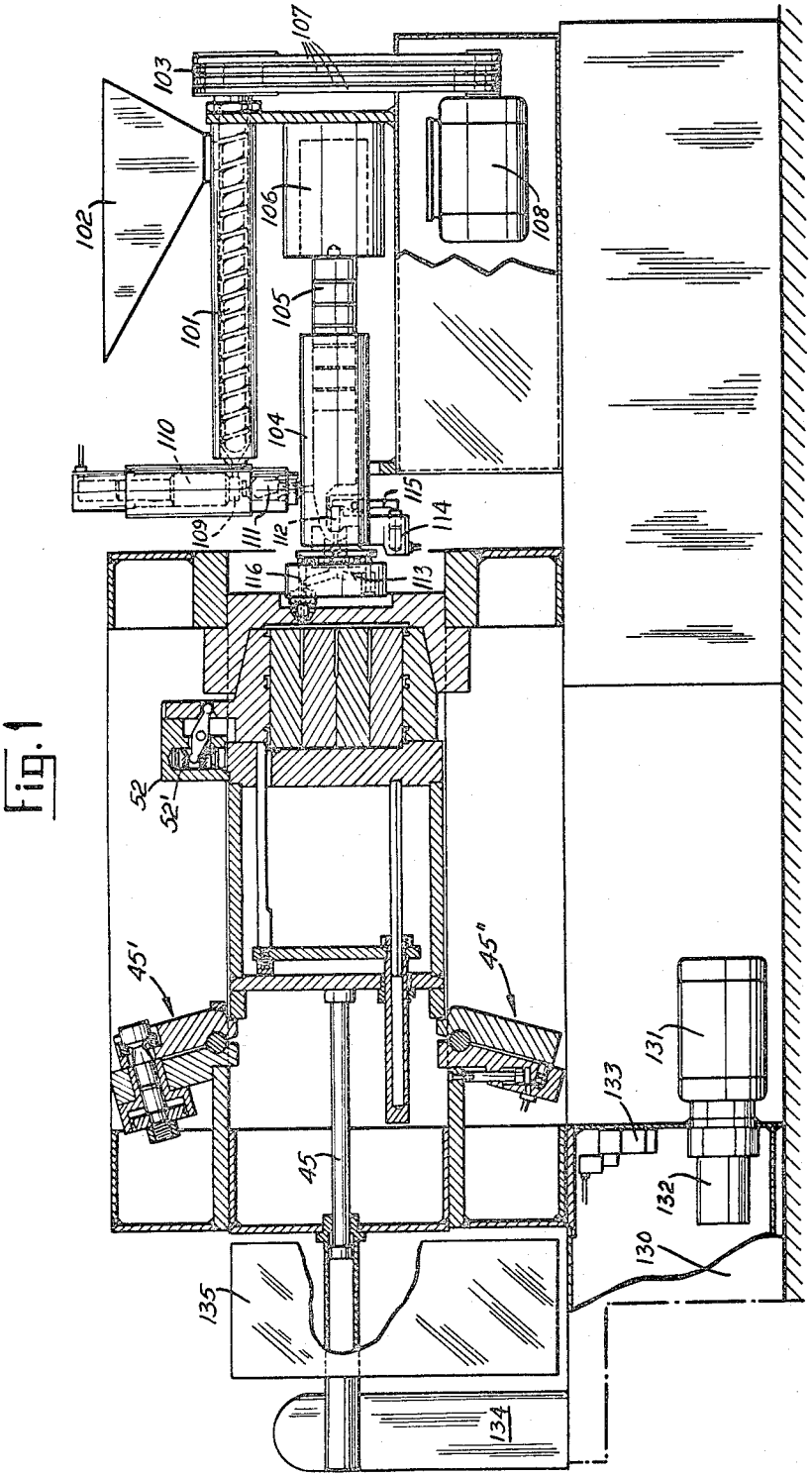

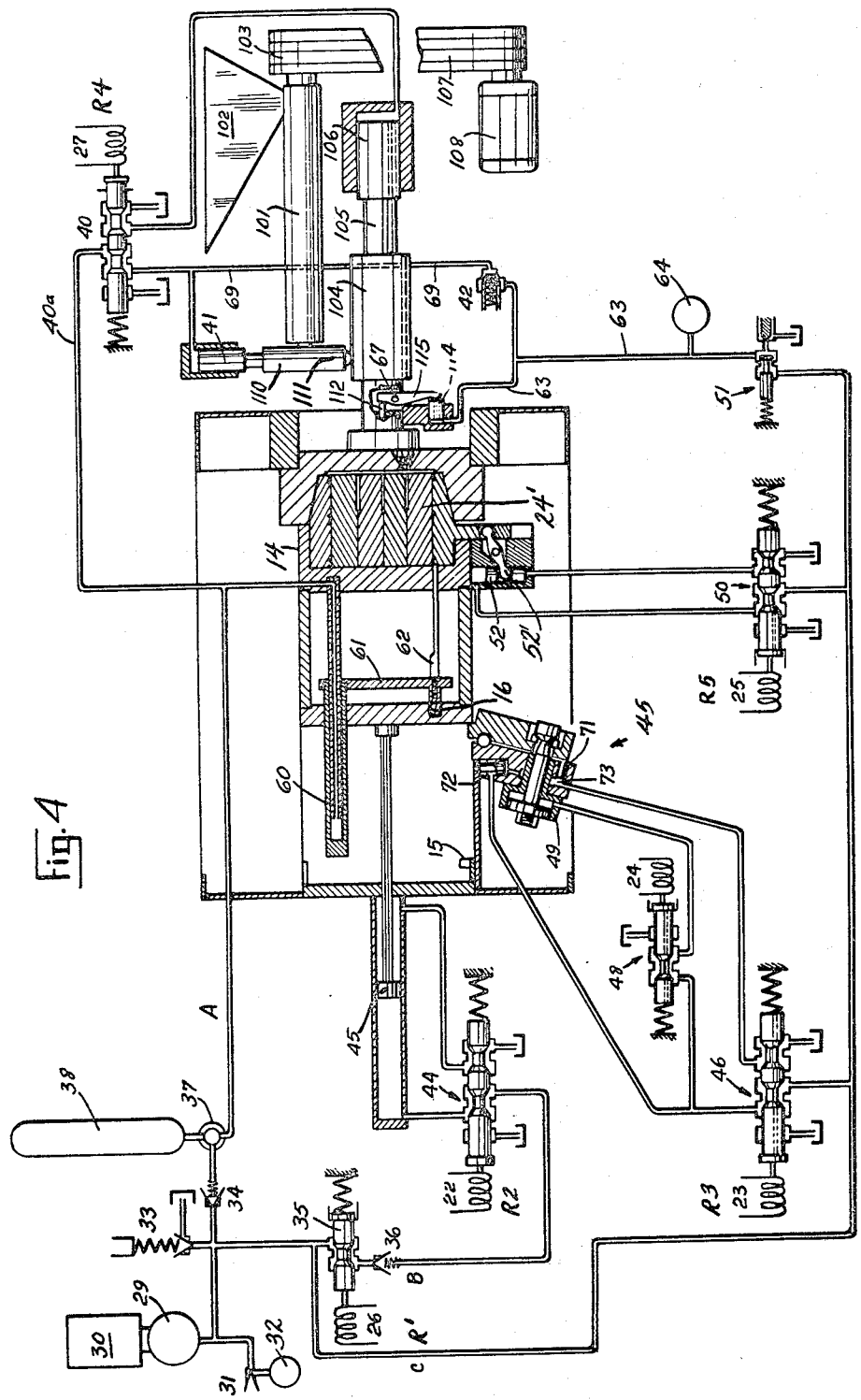

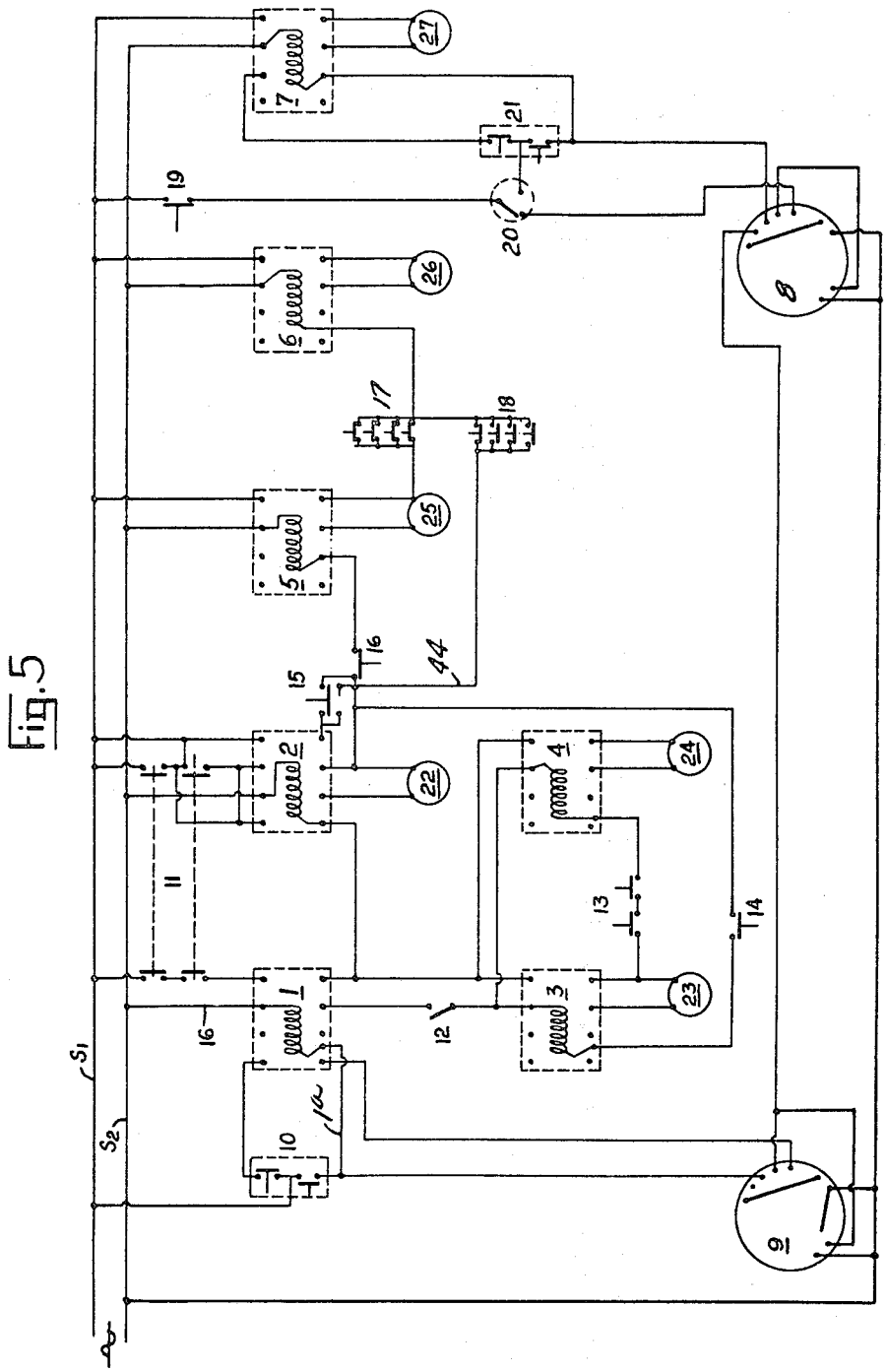

3,384,929
APPARATUS FOR MOLDING PLASTICS
Robert Nouel, Villejuif, France, assignor to Inventions Finance Corporation, a corporation of Delaware
Application Apr. 15, 1963, Ser. No. 273,144, now Patent No. 3,296,353, dated Jan. 3, 1967, which is a continuation-in-part of application Ser. No. 89,254, Feb. 14, 1961. Divided and this application Oct. 24, 1965, Ser. No. 525,268
22 Claims. (Cl. 18—30)

This is a division of application Ser. No. 273,144, filed Apr. 15, 1963 and now Patent No. 3,296,353.

This invention relates to forming plastics by using special mobile elements for molding large size parts, and more particularly to a machine for carrying this method into practice.

The chief characteristics of the invention resides in keeping a mold closed without using a press. Novel and entirely distinct features are utilized in the apparatus hereof, and those features have precise uses and purposes, the exceptional and novel advantages of which will become apparent from the description which follows.

In my co-pending applications S.N. 89,254, filed Feb. 14, 1961 and now Patent No. 3,220,115, and S.N. 171,878, filed Feb. 2, 1962 and now Patent No. 3,241,191, and S.N. 206,507, filed June 29, 1962 and now abandoned, of which the present application is a continuation-in-part, my new methods of introducing plastic material into a mold under pressure and the regulation and control of the same material by said pressure, are fully described. The present invention is to effect certain improvements in the apparatus of said applications. While said co-pending applications are related primarily to vertical machines having conventional pressing sections the present disclosure relates to horizontal type molding machines which maintain the mold cavity components locked in position under substantial force and yet which eliminate the well-known piston-cylinder and toggle press sections of the conventional type machine.

By eliminating the conventional press section of an injection molding machine, the molding is no longer subjected to many limitations and the stringent requirements of the standard presses, such as critical spacing between columns, size of platens, height of mold, length of opening stroke, etc. Since it is no longer necessary to take the distance between the columns into account, the molded components can be produced according to this new system in very large sizes.

Hydromechanical force applying devices are utilized to maintain the mold sections in engagement and the simplified nature of the hydromechanical force devices described hereinbelow, and their high power-to-weight ratio and low power consumption are significant factors which permit the attainment of very high clamping power, such power can be increased in proportion to the number and the force of the applying units utilized.

In addition, a special unit for plasticizing the material is incorporated in the molding apparatus. Ths specal unit possesses several improved features. First, a chamber for recovering the plasticized material permits the use and continuous rotation of a plasticizing screw. This continuous rotation results in a uniform plastic free from tanting, and also leads to greater plasticization. Secondly, the unit is equipped with an automatic system for regulating the pressure of the plastic within the mold. Some very important advantages result from this regulating system, namely an adjustable final injection pressure, high injection speed, and the ability to use highly simplified hydraulic circuit means. Finally, a special hydraulic unit supplies the power required. This power is accumulated in a special oleo-pneumatic tank, which allows for rapid injection of the plastic into the mold.

The new method of this invention is not subjected to any of the stringent and troublesome operating requirements of conventional molding methods. It is intended for the production of heavy mold pieces having a large frontal surface area, through the use of said methods and machines of the invention, in particular, the special regulating and hydomechanical systems described herein.

Certain apparatus embodiments of the invention contemplate utilizing individually and in combination: (a) special hydromechanical force applying devices as described in my co-pending applications S.N. 173,103 now Patent No. 3,241,187, S.N. 187,480, now abandoned and S.N. 206,508 now Patent No. 3,241,827; (b) a special plasticization, injection and regulation system as described in my above mentioned co-pending applications S.N. 89,254 and S.N. 171,878, S.N. 296,507; and (c) a cooperating hydraulic control arrangement for supplying the power required for the operation of the overall system.

The principal object of the invention is the provision of a new method of molding, and an apparatus to carry out said method of molding, which method and apparatus can be used on, or in combination with, available injection molding machines.

Other and more specific objects of the present invention are to provide: (a) a method of molding and apparatus for performing such method of molding, capable of producing mold pieces having large frontal molded surfaces; (b) such a method and apparatus which are capable of providing molded articles through lower injection temperatures than previously encountered and with high injection speeds; (c) such an apparatus which obtains a high degree of plasticization through a novel regulation and control system provided hereby and incorporated therein, and; (d) such a method and apparatus which achieve the desired result with reduced contraction, a low power consumtion in the mold, and reduced size and cost of the machine.

Further objects and embodiments of the invention will become apparent when consideration is given to the following detailed description of the invention. The description refers to the annexed drawings, wherein:

FIGURE 1 is a side sectional view of one form of molding machine provided hereby and adopted to carry out the method embodiments of the present invention, FIGURE 2 is an enlarged view of the regulation section of the machine shown in FIGURE 1, FIGURE 3 is a top view of the mold feeding nozzle of the machine shown in FIGURE 1, FIGURE 4 is a schematic diagram illustrating the hydraulic operation and regulation system of a machine constructed in accordance herewith, and FIGURE 5 is another schematic diagram but illustrating the electrical regulation system of a machine constructed in accordance herewith.

By reference to the drawings and the following description, it will be seen that the feed unit of the machine shown in the drawings and constructed as herein described is equipped with a special plasticizing screw mechanism and a chamber which recovers the excess plasticized material from said screw mechanism during the injection process. This recovery process enables the feed or plasticizing screw to be rotated continuously, which in turn results in a uniform plastic, free from any defects due to overheating.

The plasticizing section of the unit consists of a plasticizing means, a transfer section and a regulating section.

The plasticizing section comprises as shown in FIGURE 1, an extruding screw 101, by hopper 102 for supplying plastic to the screw, a motor 108 for driving the screw through driving belts 107, and a reduction unit 103 as shown in FIGURES 1 and 4. This section further includes a recovery chamber 109 forming a variable capacity reservoir. The reservoir has a hydro actuated piston 110 therein for the plasticized material, and a non-return or check valve 111 (FIGURE 2) permitting free passage of material from the screw 101 toward the transfer cylinder 104. Said transfer cylinder and its delivery piston 105 are actuated by hydraulic piston 106, as shown best in FIGURE 4.

At the head of the transfer cylinder 104, I provide a regulating section including the regulating seat or ring 113 and cooperating obturating and regulating slide valve 112. A small hydraulic piston 114 (FIGURES 1, 2 and 4) provides the regulating and obturating of both pressures and speed which are controlled by lever 115. Said regulating section is equipped at its inlet end with a distribution block 116 incorporating a plurality of automatically obturated nozzles 116' which feed the mold cavity at several different points. Springs 114' urge block 116a of distribution system 116 into engagement with the block 113a having regulator slide valve 112 and its associated seat 113 therein.

Regulator or slide-valve 112, which is an important feature of the apparatus provided hereby permits the high-speed introduction of the plastic, together with full control over the rate of feed and the final low pressure prevailing inside the mold. The low final pressure makes possible up to a tenfold increase in the frontal molding area. Regulation in this embodiment is insured by hydraulic piston 114, which provides regulating and obturating pressures alike. These two pressures replace the regulating spring 67 and the obturating spring 63 in FIGURES 3 and 8 of my co-pending application S.N. 171,878, entitled Method and Apparatus for Molding Plastics. The regulator 112 is subjected, through the medium of lever 115 to the countering thrust of the hydraulic piston 114.

The thrust exerted by the hydraulic piston 114, is adjusted according to the pressure which it is required to be responsive on completion of the mold feeding operation. The hydraulic circuit associated with the regulating section is very simple. A hydraulic regulator 51 supplies the regulating pressure, while the obturating pressure is tapped off the injection distributor. This pressure is therefore the total pressure and is exerted only when the transfer piston 105 is withdrawn and the recovery chamber piston 110 is advancing. It will be noted that this advance gives rise to a dual feed. These two flows of material mix together and pass through the non-return valve 111, after which another mixture takes place in conjunction with a rapid withdrawal of piston 105.

Hydraulic unit

As stated hereabove, the general design of this molding machine takes due account of two important features, namely the means used to control the material and the hydromechanical clamps. Its hydraulic unit contains all the hydraulic components for supplying the power required for the operation of the system. This will be clearly understood from an examination of the electrical control panel 135 (FIGURE 1) and the corresponding wiring diagrams (FIGURE 5). The great simplicity of operation of the system has been achieved by grouping together the distributors 133 and the flexible lines supplying the various valves. In the specific example illustrated, the hydraulic power section comprises a tank 30, a hydraulic pump 32, an electric motor 29, a hydraulic accumulator 38, distributor control valves 31, 33, 34 (FIGURE 4). The hydraulic power section further serves as a support for the force applying clamp closing of the molds.

Closure of the molds

In the machine illustrated in the drawings and constructed in accordance with the invention, mold closure is accomplished by means of two individual and separate hydromechanical securing devices. These two clamps which are operated in sequence with other components of the machine, as explained more fully below, secure the mold through external tie rods with the mold hoop acting as a spacer for the tie rods.

In the specific embodiment illustrated, displacement of the mold is obtained by means of a jack which is used to move the mold parts to open and closed positions. In addition, opening of the mold allows the molded part to be ejected. FIGURE 1 clearly shows that the mold herein described in a special mold made up of shell sections. Lateral stripping means are provided to extract any unstrippable parts from the mold.

The two clamps 45' and 45" illustrated exert a pressure of 300 tons each so that the mold will be clamped with a total pressure of 600 tons. The total weight of the two hydromechanical clamps being 150 kg., one attains the very high power-to-weight ratio of $$\frac{600}{150} = 4$$

i.e. a clamping power of 4 tons per kilogram of steel. In other words, 250 grams of steel are required to provide each ton of clamping force.

The very low power consumption (500 cubic centimeters of oil at 300 kg./cm.$^2$ per hydromechanical clamp, i.e.

$$\frac{500 \text{ cm.}^3}{300 \text{ tons}} = 1.66 \text{ cm.}^3$$

per ton of clamping force) shows the very small expenditure of energy involved in relation to the clamping power developed.

Each of the said hydromechanical clamps basically consists of a hydraulic power multiplying clamp having a pivoted clamping jaw which is moved beneath the part to be clamped and which then pivots and clamps the mold sections together. In the accompanying drawings, the power consumption is remarkably low; being 1 liter of oil at 300 kg./cm.$^2$ (with the hydraulic accumulator). For a production rate of one four-pound molded part per minute, a pump powered by a three-quarter horsepower motor is entirely adequate. This stresses the very small energy consumption in relation to the 600-ton clamping pressure, which allows for molding very large parts as stated. The power saved can be transferred with advantage to the means used for injecting the material.

The main features of this clamping systems, as noted, are the low power consumption, the high clamping power exerted, the small bulk and the low cost of the machine. These assertions are justified by the fact that provision can be made for two hydromechanical clamps positioned side by side on each set of tie rods, whereupon the clamping power increases proportionately and attains 1200 tons. One can thus utilize a mold of the following dimensions:

Dimensions of the mold

Closed: 970 x 870 mm.; height 1100 mm.
Open: 1000 x 900 mm.; height 1650 mm.
Distance between the uprights supporting the hydromechanical clamps (overall dimension of the mold): 1300 x 1000 x 1000 mm.

It will be noted that the mold herein described is very large in relation to the object to be molded. This is necessary because of the outer unstrippable areas. Moreover, in the embodiment shown, it would be possible to mold a part measuring 1300 x 900 x 35 high and the frontal molded area would be of the order of 11,700 cm.$^2$.

Several important features result from this system as will be apparent after reviewing the described operation below.

First, there is uniform and rapid plasticization and, secondly, a strict control of the plasticized material. The material is treated as a fluid in the regulator thereby allowing for easy molding. This form of regulating provides absolute control of the degree of opening the molds, in response to the pressure exerted by the plastic. In addition, this form of regulating, eliminates all hydraulic accessories, since there is a direct connection to the accumulator.

The rapid introduction of the plastic into the mold avoids a temperature rise, which means that molding can be carried out at lower injection temperatures, thus leading to greater molding speeds while giving all around better performance and quality molding results.

Furthermore, the regulator, which reduces and controls the pressure of the plasticized material in the mold at the end of the filling operation, circumvents the need to produce massive and expensive molds. Such controls in conjunction with the high injection speed and reduced pressure at the end of the automatic filling process, avoid the enormous internal contractions which take place in the molds and consequently make it possible to reduce the size of said molds.

OPERATION OF THE SYSTEM (1) *Closure.*—The first step is to close a switch 10 which energizes the relay 1 by connecting the same across supply lines 1a and 16. Relay 1 then operates and remains energized by its self-energizing contact, controlled by cooling timer 9, an internal contact between 8 and 10 being provided in the inoperative position. A second relay 2 closes and its closure is controlled by safety switch 11. Said relay 2 operates the advance electromagnet 22, whereupon a five way distributor 44 feeds the cylinder for piston 45 through B, the latter directing the oil to the left. The jack piston 45 moves forward, or to the left as shown.

During the advance of piston 45, pressure fluid feeding passageway A which connects with the mold ejector pistons 60, causes the ejection plate 61 with its ejectors 62 to move back or to the left in FIGURE 4. When it reaches the end of its travel, said plate 61 operates a contact 16 which triggers the electromagnet 25 through relay 5, thus controlling the stripping of the shells 24 from one mold section. A five way distributor 50 is operated by electromagnet 25, and this distributor operates the shell closing system and the shells then advance simultaneously with advance of levers 52, whereupon the contacts 18 close thus connecting relay 6 across the supply lines $S^1$ and $S^2$. With this connection, the motion is stopped by the safety device 35 which cuts off passageway B due to the control of electromagnet 26 by relay 6.

When the mold shells are fully closed, the contact 17 and the relay 6 (which have operated the safety stopping device) opens. The supply of fluid is then resumed via conduit B and the advancing motion of the mold section continues. When the end of travel is reached, with the mold fully closed, a switch 14 is closed thus energizing relay 3 (switch 12 being closed), whereupon the latter relay 3 energizes an electromagnet 23 whereby the return spring of the distributor 46 is compressed and said distributor 46 simultaneously feeds hydraulic fluid from conduit C to effect the advance motion of the hydromechanical clamps 45', 45'' and the three way distributor 48. When the limit of travel is reached, contact 13 energizes relay 4 which then closes. Closing of relay 4 energizes electromagnet 24 which in turn actuates the three way distributor 46 and causes the jaws of the hydromechanical clamps to pivot. The closing operation is thus completed.

(2) *Injection.*—When the end of advance motion of the mold section is reached, a switch 19 dispatches current simultaneously to an injection timer 18 (which is then set in motion) and to a relay 7. The latter then closes; the electromagnet 27 operates a five way distributor 40 and pressurized oil is directed from conduit A against piston 41 of passageway 69, whereupon said piston 41 advances. Piston 41 is no longer supplied with oil and non-return valve 111 (FIGURE 2) is no longer under pressure of the plastic material. The obturating pressure in passageway 63 is eliminated, since the material is not under pressure and only a regulating pressure remains in passageway 63 and beneath the obturating and regulating valve piston 114. This regulating pressure is adjustable by means of a hydraulic regulator 51 and is monitored by a pressure gauge 64.

Under the control exerted by valve piston 114, the plastic material enters the mold after it has passed from the plastic material regulating chamber 113a. After the feed process is terminated, the pressure in the regulating chamber 113a increases due to filling of the mold, and stabilizes at the adjusted regulating pressure. Valve 112 moves to the left as shown in the feed of plastic material. During the obturation, the regulating valve piston 114 will have withdrawn against the pressure transmitted by lever 115 and regulator slide valve 112. The injection process is then complete.

During this time, the injection timer 8 rotates and meters the regulating time. When the time lag has elapsed, said timer cuts off the current to timers 8 and 9, whereupon relay 7 is no longer energized and releases. This, in turn, triggers the electromagnet 27, and the plunger of distributor 40 then moves back in response to the spring loading means acting on it, and reverses the direction of the oil, thereby placing the passageway 69 in communication with the return line 40a while maintaining the passageway 63 under pressure. Fluid in passageway 63 controls the regulator. Non-return valve 111 rises upon rising of piston 41 due to the drain of fluid through the line 69 and the absence of pressure above valve 111. Since the obtruating pressure in line 63 is higher than the regulating pressure, the regulating obturating tip 112' closes. Thereafter the plastic material is driven out of the recovery chamber 109 by piston 110, and this material in turn expels the injection piston 105 from the transfer chamber 104. It should be noted also that the plasticization screw assists this expulsion.

The injection withdrawal is then complete.

(3) *Opening.*—When the time lag introduced by the operation of the timer 8 has elapsed, said timer starts a second timer 9 which is effectively the cooling timer. When the time lag introduced by the cooling timer 9 has elapsed, this second timer cuts off the self energizing current to the relay 1, whereupon two other relays 3 and 4, being coupled in series therewith, are de-energized. Electromagnets 23 and 24 are, in turn, successively de-energized causing the two hydraulic pistons 46 and 48 to reverse, and the fluid under pressure to reach the pivoting piston 71 of the clamps 45', 45''. The fluid enters the chambers 72 through the circular channels 73 thereof and causes the hydromechanical clamps to withdraw and pivot, the fluid contained in chambers 49 being driven out into a hydraulic fluid sump tank (not shown) connected with the pump 29.

When the limit of withdrawal and pivotal motion is reached, contacts 11 energize relay 2. The advancing distributor 44 is then in communication with the return line, which causes mold section 45 to withdraw, thereby exerting a pull and opening the mold. In addition, since relay 5 is no longer energized, it also cuts out the shell opening electromagnet. Distributor 50 reverses, contacts 17 close, and the mold section continues (by piston 45) to withdraw until it comes into contact with stop switch 15, which causes the withdrawal motion to stop. Since relay 6 is energized through a contact of relay 2, through switch 15, and through various contacts 18, the safety device 35 is operated and the system comes to a halt.

The mold sections then reach their maximum opening and contacts 18 open. Since the relay 6 is no longer energized, the withdrawal motion is resumed. The mold ejector pistons 60 then come into contact as the result of the pressure differential, and the fluid in said pistons is expelled and ejection plate 61 moves forward with its ejector 62, whereupon the molded part in the shells is ejected by engagement with the ejectors.

The cycle is then complete; all the operations take place entirely automatically and with high reliability.

Consistent with the above described embodiments and various modifications thereof, the following results can be appreciated:

(1) That injection molding machines are no longer subjected to the requirements of conventional presses, since the molds are no longer subjected to the costly pressing or jacking action of the piston cylinder-toggle in the conventional systems.

(2) That by eliminating the standard press systems, the function of the molds depends solely on the locking units and the strength of said units, mounted externally, independently and directly on the molds or the platens holding said molds.

(3) That by using the new force applying clamping means, mold parts of any size or shape can be clamped with force virtually unlimited as the number, size and the force of the clamping means can be increased as needed, to give the force required.

(4) That since the frontal areas and size of the molds are no longer the function of the conventional press action, the press action no longer limits the sizes of the supporting plates or the distance between centers of the frame, much less the ejection, centering or fixing problems, and moreover the height of the molded pieces no longer is directly related to the closure stroke of the conventional machines.

(5) That since the molding of large and heavy area articles is no longer the function of the size of the machine or its pressing section, the production of these molded articles no longer needs a press of a particular size capable of their execution.

(6) Since such articles are obtained through controlled low pressure and high injection speed, it is this temperature which determines the increase in the production ratio. Such system is obtained with a single hydraulic pressure system by elimination of the hydraulic regulators and other intermediary parts.

(7) That the hydraulic consumption being exceptionally low, the excess power obtained can be transferred to the injection means with a result of a very low consumption of energy of the entire unit.

After reading the foregoing detailed description of the illustrative embodiments of the invention, it should be readily appreciated that the objects set forth at the outset of this specification have been successfully achieved. Various modifications may occur to those reading this specification, since the molding machine may have other alternative embodiments than those specifically suggested. Regardless of these modifications, however, it is to be understood that I am not limiting myself to the details shown herein, except as required by the scope of the claims.

What is claimed is:

1. In an injection molding machine including a molding apparatus comprised of at least two mold members forming a mold cavity and relatively movable with respect to each other, means to control the flow of moldable material to said cavity, feeding mechanism for variably storing moldable material relative to said cavity, said feeding mechanism comprising a continuously rotating screw feeding means, a variable capacity reservoir for receiving and storing said material fed by said screw feeding means, transfer means connected with and receiving material from said reservoir, said transfer means including means for forcibly intermittently feeding the material to said mold cavity as required by said cavity.

2. In an injection molding machine comprised of at least two mold members forming a mold cavity and relatively movable with respect to each other for opening and closing thereof, power actuated locking means including lever means for locking said mold members, feeding mechanism associated with said mold members for intermittently feeding molding material into said cavity, said machine including means for continuously feeding the molding material to said molding apparatus irrespective of whether the molding cavity is opened or closed during the entire time the molding machine is being operated and a variable capacity reservoir means for storing said molding material during said time.

3. In a molding machine having separable mold sections defining a mold cavity, and means for feeding material in a plastic state into said cavity, said feeding means comprising a continuously rotating screw feeding means, a variable capacity reservoir for receiving and storing material fed by said screw feeding means, the combination of power operated regulator means for controlling said feeding of the material, power actuated means for opening and closing said mold sections and separate power actuated force multiplying means associated with said mold sections independently of said power actuated means for maintaining said sections in engagement under substantial pressure during a molding operation.

4. In a molding machine having separable relatively movable mold sections defining a mold cavity, and means for feeding material in a plastic state into said cavity, said feeding means comprising a continuously rotating screw feeding means, a variable capacity reservoir for receiving and storing material fed by said screw feeding means, power means for relatively moving said mold sections into engagement, and separate power actuated force multiplying clamp means for maintaining said mold sections in tight engagement under substantial pressure during a molding operation, said clamp means including lever means pivotally mounted with respect to the axis of movement of said sections and including power means for sequentially moving said clamp means from a release position into clamping position and then operating said clamp lever means to maintain said mold sections in engagement.

5. The combination defined in claim 4 wherein said first mentioned power actuated means for relatively moving said mold sections into engagement includes a frame and a mold section support member reciprocal therein, and wherein said clamp means are carried on said frame and clamp against said mold section support member.

6. The combination defined in claim 4 wherein said power means includes a fluid pressure system having a single fluid pressure pump means, said power means for operating said mold sections and said power means for sequentially pivoting and operating said clamps being coupled in said fluid pressure system.

7. The combination defined in claim 6 wherein said fluid pressure system further includes a plurality of solenoid operated valve means for controlling said mold sections and said clamp means, an electric circuit including means for sequentially operating said valve means, a pair of hydraulic fluid feed lines, and a safety device in said lines for diverting hydraulic flow therebetween.

8. In combination with a molding machine having relatively separable mold sections defining at least one mold cavity therebetween, and power driven means for feeding material in a plaastic state into said mold cavity, said feeding means comprising a continuously rotating screw feeding means, a variable capacity reservoir for receiving and storing material fed by said screw feeding means, individual force multiplying clamping devices mounted adjacent one of said mold sections for maintaining said mold sections in engagement under substantial pressure, said clamping devices including pivoted jaw means mounted for transverse movement bodily with respect to the separation axis of movement of said mold sections into and out of clamping position, and power means for sequentially effecting movement of said clamping devices into clamping position and sequentially pivoting said jaw means into clamping relation to said mold sections.

9. In combination with a molding machine having relatively separable mold sections, means for feeding material in a plastic state into said cavity including a continuously rotating screw feeding means, a variable capacity reservoir for receiving and storing said material fed by said screw feeding means, ejection means cooperating with at least one of said mold sections and being withdrawable from said mold section, piston means for opening and closing said mold sections, power actuated force multiplying clamping means including clamp moving and lever means for clamping and maintaining said mold sections closed, pressure fluid supply means including at least two pressure fluid feed lines coupled with said clamping means, and a plurality of valves coupled in said pressure fluid feed lines for controlling the flow of pressure fluid to said clamping means.

10. The combination defined in claim 9 wherein at least one of said valves being connected with each of said clamping means and one of said feed lines, a fluid pressure source forming part of said power supply means, and a safety control valve for selectively directing fluid from said fluid pressure source to one or the other of said fluid pressure feed lines.

11. The combination defined in claim 9 and further including electrical circuit means for operating said valves, said circuit means including at least one self-energizing relay for initiating operation of said electrical circuit means and said piston means, a relay controlling said plurality of valves and at least one pair of contacts, said contacts being engageable by said ejection means for selective energization of at least one of said other relays.

12. The combination defined in claim 9 and further including moldable material feed means and moldable material feed regulator means coupled in said pressure fluid feed lines, a moldable material pressure regulator fluid coupled between said pressure fluid feed means and said feed regulator means, and solenoid operated valve means in said feed lines to control the supply of pressure fluid to said feed means and said feed regulator means simultaneously.

13. The combination defined in claim 12 and further including timing means for successively energizing said solenoid operated fluid flow control valves, and wherein said timer means includes successively selectively operable switch means for energizing said further relays to control said clamp moving means and said clamp lever means in succession.

14. The combination defined in claim 9 and further including hydraulically operable moldable material feed means and pressure fluid operable regulator means therefor, said moldable material feed means and said regulator means being coupled to and controlled by said pressure fluid feed lines, at least one additional valve in said pressure fluid feed lines for controlling operation of said moldable material feed means and said regulator means, and at least one additional relay for controlling said additional valve, said additional relay being connected to said timer means for energization thereby.

15. In a molding machine having separable mold sections defining a mold cavity, and moldable material passageway means communicating with said cavity, the combination of individual force-multiplying clamp means for maintaining said mold sections in tight engagement during a molding operation, means for feeding moldable material to said mold cavity including screw feeding means, said means comprising transfer chamber means, recovery chamber means of variable capacity for receiving and storing material fed by said screw feeding means, and screw feed means, power actuated regular means, first power operable piston means for expelling material from said transfer chamber means to said regulator means, second power operable piston means for expelling material from said recovery chamber means to said power activated regulator means, and a common power supply means connected with said first and second piston means and said regulator means for effecting operation thereof.

16. The combination defined in claim 15 and further including sequentially operable valve means in said power supply means, and means for sequentially operating said valve means to succesively cause advancing movement of said first piston means and expelling of material from said transfer chamber means to fill said cavity, and advancing of said second piston means and expelling of material from said recovery chamber means into said transfer chamber means to refill said transfer chamber means and cause withdrawal movement of said first piston means in said transfer chamber means.

17. The combination defined in claim 15 wherein said power supply means further includes hydraulic fluid means connecting said first piston means and said regulator means, and means coupled in said hydraulic fluid means for selectively regulating the hydraulic pressure transfer between said first piston means and said regulator means.

18. The combination defined in claim 15 and further including electrically operable hydraulic valve means for sequentially operating said clamp means and then said second piston means.

19. In a molding machine having relatively separable mold sections defining a mold cavity, and means for feeding material in a plastic state into said cavity including a continuously rotating screw feeding means, a variable capacity reservoir for receiving and storing said material fed by said screw feeding means, the combination of power operated regulator means for controlling the said feeding of material, and individual force multiplying clamp means for maintaining said mold sections in engagement under substantial pressure during a molding operation, said regulator means including a housing having at least two compartments therein; a slide valve having first and second heads thereon, a ring seat member disposed within said housing and having a seat separating said compartments, one of said heads being disposed in one of said compartments and engagebale with said seat, the other of said heads being reciprocal in said one compartment to seal off said molding material from said mold cavity when the molding operation is terminated, and power actuated biased lever means for urging said one head out of engagement with said seat.

20. The combination defined in claim 19 wherein said means for feeding material to said cavity includes hydraulically powered means driving said operated feed means, and further including hydraulic means for hydraulically biasing and controlling said lever means in operating relation to said material feeding means.

21. In a molding machine having separable mold sections defining a mold cavity, means for feeding material in a plastic state into said cavity comprising a continuously rotating screw feeding means, a variable capacity reservoir for receiving and storing said material fed by said screw feeding means, and including power operable piston means, and power operable ejection means cooperating with at least one of said mold sections; the combination of power operable force multiplying clamp means for maintaining said mold sections in engagement under substantial pressure while material is fed to said mold cavity and during the molding thereof, power actuated feed system including pump means, separate controlling valve means associated individually with all of said power operable means, actuating means operatively associated individually with each of said valve means for actuation thereof, and electric circuit means for automatically sequentially operating said actuating means to withdraw said ejection means from said one mold section and operate said clamping means to maintain said mold sections in engagement and sequentially operating said piston means and for thereafter repeating the said sequential operations in reverse.

22. The combination defined in claim 21 wherein said electric circuit means including timing means for timing the said sequential operations to provide a time delay period in said operations to permit said material fed into said mold cavity to solidify before being ejected therefrom.

References Cited

UNITED STATES PATENTS

| | | | |
|---|---|---|---|
| 1,552,768 | 9/1925 | Smith | 60—52 |
| 2,359,840 | 10/1944 | Goessling | 264—329 |
| 3,029,483 | 4/1962 | Mills et al. | |
| 3,117,348 | 1/1964 | Rees | 18—30 |
| 3,241,187 | 3/1966 | Nouel | 18—30 |

WILBUR L. McBAY, *Primary Examiner.*